United States Patent Office 3,036,942
Patented May 29, 1962

3,036,942
MOLDED AUTOMOBILE FLOOR COVERING AND METHOD FOR PRODUCING SAME
William H. Squier, Greensboro, N.C., assignor to J.P. Stevens & Co., Inc., a corporation of Delaware
No Drawing. Filed Oct. 19, 1960, Ser. No. 63,479
2 Claims. (Cl. 154—49)

The present invention relates to a molded automobile floor covering and to a method for making same, and more particularly constitutes an improvement in the method described in copending application Serial No. 786,600, filed January 13, 1959.

In the method of making floor mats described in that application, polyvinyl acetate resin is applied to the woven jute backing of a tufted carpet. The resin coated carpet backing is then brought into alignment and superimposed with a jute matting that has been previously impregnated with a styrene-butadiene composition and dried. The carpet and jute matting are then placed in a press such as described in copending application Serial No. 786,617, filed January 13, 1959, where heat and pressure mold the floor mat into desired shape and laminate the carpet backing to the jute matting.

The principal difficulty with the above method is that the carpets tend to delaminate after a time interval, i.e., the woven jute carpet backing becomes separated from the jute matting. Another, but less important, problem has been that the tuft lock is not as strong as desired, i.e., four pounds or more.

The problem of delamination has plagued the molded, tufted carpet industry for some time, and efforts to solve the problem by utilizing bonding agents made from polyvinyl acetate resins, polyvinyl chloride resins, epoxy resins, urea formaldehyde resins, natural rubber, synthetic rubber, reclaimed rubber and mixtures thereof, have not been successful. The problem of selecting or compounding a bonding agent has been made more complicated by the fact that many adhesives and solvents used therewith will ignite and create a fire hazard at the high temperatures needed to mold the carpet.

The problem of delamination has become so acute in the automobile floor mat industry that the industry has reverted to laborious and time consuming methods of producing automobile floor mats in an effort to solve the problem.

For example, the principal method of making molded carpets is to apply liquid polyvinyl acetate to the carpet backing, dry the polyvinyl acetate coated carpet in an oven, and then cut the coated carpet into appropriate lengths. Pre-cut lengths of garnetted jute mats and the woven jute carpet backing are then sprayed with natural latex and immediately superimposed and molded by steam and pressure in a press.

Another popular method presently in use is to mold a pre-cut length of garnetted jute mat into the shape of the automobile floor with dry heat in a press; spray natural latex onto the top of the molded jute mat, roller coat the bottom of the carpet backing with natural latex, and then quickly place the carpet into the molded jute mat and smooth it out by hand.

Despite the above two attempts, the problem of delamination remained.

I have improved upon the known methods of producing molded automobile floor mats so that the problem of delamination has been solved, a stronger tuft lock is produced, large savings in the cost of chemicals is realized, and I have made it possible for the industry to return to the economical continuous process described in copending applications Serial Nos. 786,600 and 786,617, both filed on January 13, 1959.

I have found that a bonding agent obtained by combining polyethylene with a petroleum resin polymer formed essentially from dienes and reactive olefins imparts exceptional tuft locking and lamination properties to molded, tufted carpets with a jute mat or underlay. The bond formed between the woven carpet backing and the jute underlay is so permanent that forceful attempts to cause delamination by pulling apart the carpet backing and mat result in tearing of the garnetted jute mat but do not result in delamination. The prior art methods have rarely afforded the degree of tuft locking desired in molded, automobile carpets, i.e., four pounds, but by use of my novel method, more than six pounds tuft lock is obtained. In addition, the chemicals utilized in practicing my invention cost only about one half as much as do the chemicals utilized in present methods. Also, the ignition temperature of my bonding agent is about 500° F., which is substantially above the temperatures utilized in my method, and no fire hazard is created.

The beneficial results are obtained from my process primarily because of the exceptionally strong bond formed between the garnetted jute pad and the woven jute carpet backing, by use of the bonding agent as described herein, and also because the bonding agent strongly locks the carpet tufts into the woven jute carpet backing.

The bonding agent or adhesive composition utilized in my process is formed from polyethylene and a petroleum resin. Although other polyethylenes may be used, I prefer a polyethylene manufactured by the high pressure polymerization method, having an average molecular weight of 6,600, a melt viscosity of 8,000 centistokes and a density of 0.907. This polyethylene is commercially available under the trade name "Epolene C" from Eastman Chemical Products, Inc. The solid petroleum resin that I utilize in my adhesive is a polymer formed essentially from dienes and readily polymerizable olefins. This resin is formed by heating a metal halide catalyst selected from the group consisting of aluminum chloride and aluminum bromide with the stream that is obtained from deeply cracked and subsequently refined and fractionated petroleum stocks and which stream boils 90% below 125° C., drowning the reaction with 4% to 5% sulfuric acid in water, washing the reacted liquid with water, washing the reacted liquid with an alkali selected from the group consisting of 10% $Na_2CO_3$ in water and 30% KOH in water, dechlorinating to remove hydrogen chloride in organic complexes, distilling off the solvent content and recovering the solid resin.

The petroleum resin that I prefer to use is made by the above process and is commercially available under the tradename "Piccopale 100S" from Pennsylvania Industrial Chemical Corp. It has the following characteristics: Softening point, ball and ring 100±3° C., specific gravity at 25/25° C. .970–.975, pound per gallon 8.12, color 2½ max. on Coal Tar Scale, F. on Rosin Scale and 13 on Gardner scale, flash point C.O.C. 500° F., fire point 500° F., refractive index at 20° C. 1.5116, dielectric constant at 100 cy. 2.33±.05, loss tangent at 100 cy. 0.003, at 10,000 cy. 0.0003, at 1 mc. 0.0005, at 100 mc. 0.0008± .0004, acid number less than 1, saponification number less than 2, ash 0.2% max., iodine value (WIJS) 120, iodine value (corrected for substitution) 30, bromine number 7.3, molecular weight approximately 1100, double bonds per mol. (bromine number) 1, hydrogen absorption (Adams catalyst) practically nil.

A description of the preferred method of practicing my invention follows.

An adhesive composition, formed by mixing equal parts by weight of the above described polyethylene and petroleum hydrocarbon resin, is heated to and maintained at 300° F. to 350° F., at which temperature it becomes a liquid. The molten adhesive is evenly applied by roller coating as a hot melt mix to the bottom of the woven jute backing of a tufted carpet, which is passed against the applicator as a continuous sheet. About 23.5 ounces avoirdupois of the molten adhesive is applied to each 2½ square yards of carpet.

A continuous sheet of garnetted jute mat or underlay, that has previously been treated with 20%–25% phenol formaldehyde as a dry powder to hold the jute fibers together, is brought into alignment with the previously coated woven jute carpet backing and the mat and carpet are primarily united by being passed through pressure rolls before the bonding agent solidifies.

The preliminarily united carpet and mat are then cut into appropriate lengths, and may be stacked and stored for a long period of time or immediately placed into a press.

The carpet, with the jute underlay preliminarily attached, is next placed into a "clamshell" press, which is a steam heated pressure mold having depressed and raised areas corresponding to the shape of the automobile floor on which the carpet is to be utilized. A "clamshell" press of this type is described in detail in copending application Serial No. 786,617, filed January 13, 1959. The carpet is placed into the press tufted side up, and jute underlay side down. The press is operated at a lower plate temperature of 450° F. and an upper plate temperature of 275° F. The carpet is allowed to remain in the press for approximately 2 minutes, during which time the temperature of the adhesive reaches 210° F. and the adhesive softens and locks the tufts into the woven jute backing and tightly secures the garnetted jute underlay to the carpet backing, so that delamination will not occur in the finished carpet. Following this, the molded carpet is removed from the press and trimmed in the conventional manner.

While the foregoing is a description of the preferred method of practicing my invention, it will be realized that variations may be made in the procedure without departing from the scope of the invention. For example, the respective amounts of the components of the adhesive may be varied somewhat. Also, it is not necessary that the carpet and jute underlay be preliminarily united immediately after application of the bonding agent to the carpet backing. Instead, a length of the carpet that has been treated with the bonding agent may be superposed upon a length of the pre-cut jute underlay just prior to insertion of the carpet and underlay into the "clamshell" press.

We have found that as little as 7 oz. of bonding agent on a 2½ square yard carpet will provide excellent adhesion between the carpet backing and the jute underlay, but that about 14.5 oz. of bonding agent per 2½ square yard carpet is required to provide the minimum acceptable tuft lock, i.e., 3 to 4½ pounds. We have found that 23.5 oz. of bonding agent, as specified in the above example, provides a tuft lock of 6+ pounds, which is as great as is desired and considerably greater than that previously available.

The present invention has been described in detail above for purposes of illustration only, and is not intended to be limited by this description or otherwise, except as defined in the appended claims.

I claim:

1. A method for producing an improved molded, tufted carpet for automobiles and similar vehicles, said method being particularly characterized in that it is safe, economical, and imparts strong tuft lock and resistance to delamination to the finished carpet, comprising the steps of applying to the backing of a tufted carpet as a hot melt mix a resinous bonding agent consisting of polyethylene and petroleum hydrocarbon resin formed essentially from dienes and reactive olefins, said hydrocarbon resin being further characterized in that it is derived from the deep cracking of petroleum and has a softening point (B.R.) of approximately 100° C., a specific gravity at 25° C. of .970 to .975, a refractive index at 20° C. of 1.5116, an acid number less than one, an iodine value (WIJS) of 120, a bromine number of 7.3 and a molecular weight of approximately 1100; preliminarily uniting said carpet with a fibrous mat by positioning the carpet backing adjacent to the mat; and molding lengths of said carpet and mat into desired form in a press that is heated sufficiently to soften said bonding agent so that it will laminate the carpet backing and the mat and lock the tufts into the carpet.

2. A floor covering with a two-ply laminated molded construction having a permanent contour corresponding to the contour of a vehicle floor, and in which one of the plies comprises a jute mat and the other of said plies comprises a tufted carpet material having a backing positioned adjacent to the matting, said plies being secured together and the tufts locked into the carpet by means of a thermoplastic resinous bonding agent consisting of polyethylene and petroleum hydrocarbon resin formed essentially from dienes and reactive olefins, said hydrocarbon resin being further characterized in that it is derived from the deep cracking of petroleum and has a softening point (B.R.) of approximately 100° C., a specific gravity at 25° C. of .970 to .975, a refractive index at 20° C. of 1.5116, an acid number less than one, an iodine value (WIJS) of 120, a bromine number of 7.3 and a molecular weight of approximately 1100.

References Cited in the file of this patent

UNITED STATES PATENTS

| | | |
|---|---|---|
| 2,266,846 | Buff | Dec. 23, 1941 |
| 2,914,501 | D'Ascoli | Nov. 24, 1959 |
| 2,975,150 | Johnson et al. | Mar. 14, 1961 |
| 2,991,212 | Cotterman et al. | July 4, 1961 |